J. H. HIRZ.
LUBRICATOR FOR ELEVATOR GUIDES.
APPLICATION FILED MAR. 27, 1911.
1,021,190.
Patented Mar. 26, 1912.
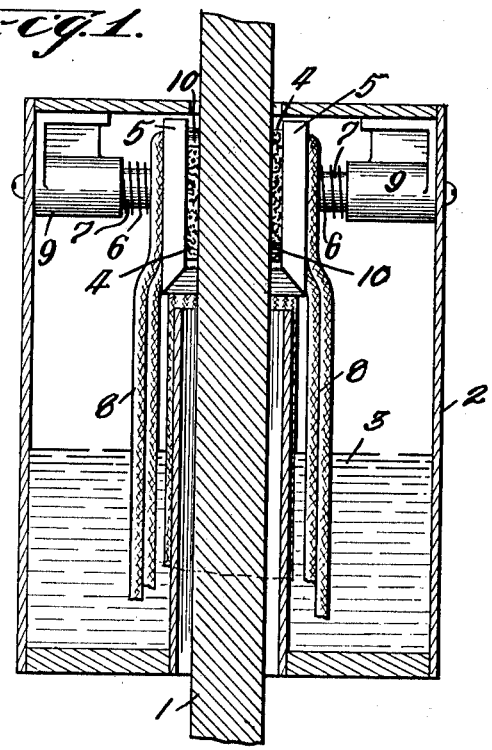
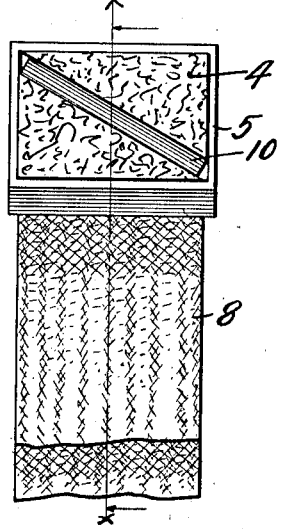
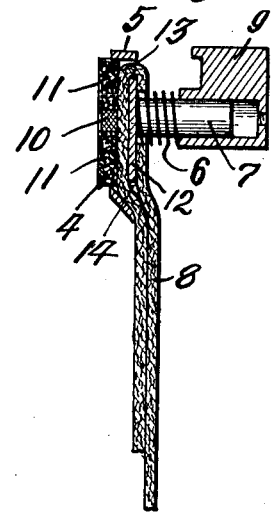

UNITED STATES PATENT OFFICE.

JOSEPH H. HIRZ, OF MILWAUKEE, WISCONSIN.

LUBRICATOR FOR ELEVATOR-GUIDES.

1,021,190.  Specification of Letters Patent.  Patented Mar. 26, 1912.

Application filed March 27, 1911. Serial No. 617,016.

*To all whom it may concern:*

Be it known that I, JOSEPH H. HIRZ, a citizen of the United States, residing at Milwaukee, county of Milwaukee, and State of Wisconsin, have invented new and useful Improvements in Lubricators for Elevator-Guides, of which the following is a specification.

My invention relates to improvements in lubricators for elevator guides, and it pertains to that class for which application Serial No. 562,354 was filed by me on the 20th day of May 1910. By the device shown in said application, a fluid lubricant is adapted to be lead by capillary attraction through a wick from a reservoir to lubricating pads, which pads are formed of felt or other similar material, and are yieldingly retained against the opposing surfaces of the elevator guides by springs, whereby, as the elevator with which such parts are connected, moves upwardly and downwardly, said guides will be automatically supplied with the required lubricant.

It will be understood that a moving elevator has a slight lateral, as well as a vertical movement, and that the springs by which the lubricating pads are retained in contact with the guides must be of sufficient length and tension to constantly retain such pads against the guides, and that when so made, the friction of the pads against the guides is such, at times, as to wear away the pads too rapidly for economic use.

The object of my invention is, therefore, to provide a resistance member formed of hard fibrous material or the like, which will be brought into contact with said guides as soon as said pads have been but slightly compressed, whereby the further pressure of the springs will be resisted by said resistance member, while the pads will bear but slightly against said guides with a constant uniform pressure.

My invention is further explained by reference to the accompanying drawings, in which—

Figure 1 represents a vertical section of a reservoir for a fluid lubricant, in connection with one of a pair of elevator guides, showing a side view of the lubricating pads, wicks, and the device for retaining said pads in yielding contact with the opposing surfaces of said pads. Fig. 2 represents a front view of one of the lubricating pads provided with my resistance member and a portion of the wick by which the fluid lubricant is drawn from the bottom of the reservoir to such pads, and Fig. 3 represents a longitudinal section drawn on line $x$—$x$ of Fig. 2.

Like parts are identified by the same reference numerals throughout the several views.

1 represents one of the elevator guides with which my device is adapted to be used.

2 is a reservoir for the fluid lubricant. 3 represents the fluid lubricant in said reservoir.

4 is a lubricating pad which is preferably formed of felt or similar soft material, and the same is retained in contact with the opposing surfaces of the guides 1, by the metallic frame 5, and the said pad is yieldingly retained in contact with the opposing surfaces of the guides by the springs 6, which springs are supported upon the cylindrical members 7, between the surfaces of the wick 8 and the supporting member 9, whereby said pad is forced against the opposing surface of said guide 1, by the recoil of said spring. It will be understood that the cylindrical member 7, serves to support and retain said spring in yielding contact with said wick, while the pressure applied to the wick is communicated to the pad 4 through the pad supporting frame 5, whereby said pad is retained, as stated, in yielding contact with the opposing surface of said guide.

The device, as thus far described, is made substantially as described in said prior application, and invention herein is predicated more especially, as stated, upon the resistance member used in connection with said pad. 10 represents the resistance member which is supported by said pad, and said resistance member is preferably located at an angle to the vertical near the center of said pad, as shown in Fig. 2, whereby as the front surfaces 11 of the pad, are slightly compressed by contact with the guides, the resistance member 10 will be brought against said guides, and the further pressure against said pad will be thereby prevented. The resistance member 10 is preferably formed of fiber or other similar material which is sufficiently hard and tough to resist the wear to which it is subjected a great length of time, whereby the friction and wear of the pad 4 is reduced to the minimum. The back of the frame 5 is inclosed by the plate 12, and said plate 12 is provided with two horizontal apertures 13 and 14, for the reception of the wick 8, said wick being preferably passed up in the rear of said frame, thence through the aperture 13, thence downwardly between the plate 8 and said pad, and thence out through the aperture 14, when the lower ends of said wick are carried below the surface of the lubricant, whereby the lubricant is fed by capillary attraction through said wick to the rear surfaces of the pad, when it penetrates the pad and is conducted thereby to the opposing surfaces of the guides 1, as shown in Fig. 1.

While I have shown and described the resistance member 10 as being preferably located at an angle to the vertical within said pad and said frame, it will be understood that said resistance member may be formed at right angles to the vertical across the center or any part of said pad, when it will serve to resist the pressure of said spring. I, however, preferably locate the resistance member 10 at an angle to the vertical, as by so doing, it serves to distribute the oil more uniformly to the right and left across the surface of the elevator guides.

It will be understood, that as the pad is moved upwardly, the lubricant will have a tendency to pass downwardly toward the right, along the upper surface of the resistance member, and that when said pad is moved downwardly, the lubricant will in like manner, be distributed in the opposite direction or toward the left, reference being had to Fig. 2.

While I have, for brevity of description, described my lubricating device in the singular, it will be understood that such device is adapted to be used upon the opposing sides of the elevator guides, as shown in Fig. 1.

Having thus described my invention, what I claim as new, and desire to secure by Letters Patent, is—

In a device of the described class, the combination with a movable lubricating pad, and a pad inclosing frame, of a resistance member formed of hard fibrous material located at an angle to the vertical within said frame, having its exposed surface substantially flush with the exposed surface of said pad, means for conducting a fluid lubricant to said pad, means for moving said pad over the bearing surface against which said pad rests, and means for yieldingly retaining said pad and resistance member in yielding contact with such opposing surface, substantially as described.

In testimony whereof I affix my signature in the presence of two witnesses.

JOSEPH H. HIRZ.

Witnesses:
JAS. B. ERWIN,
IRMA D. BREMER.

---

Copies of this patent may be obtained for five cents each, by addressing the "Commissioner of Patents, Washington, D. C."